United States Patent
Papadomanolakis et al.

(10) Patent No.: US 8,380,664 B2
(45) Date of Patent: Feb. 19, 2013

(54) TRANSACTIONALLY CONSISTENT REPLAY OF APPLICATION WORKLOADS

(75) Inventors: Efstratios Papadomanolakis, San Francisco, CA (US); Zhongtang Cai, Redwood Shores, CA (US); Romain Colle, San Francisco, CA (US); Benoit Dageville, Truckee, CA (US); Karl Dias, Foster City, CA (US); Leonidas Galanis, San Jose, CA (US); Rodney Graham, San Francisco, CA (US); Bo Gong, Foster City, CA (US); Qinghui H. Altmar, Cupertino, CA (US); Jae Young Yoon, San Mateo, CA (US); Mehmet Fidanboylu, Palo Alto, CA (US); Tom Hsu, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 41 days.

(21) Appl. No.: 13/034,526

(22) Filed: Feb. 24, 2011

(65) Prior Publication Data
US 2012/0221513 A1  Aug. 30, 2012

(51) Int. Cl.
*G06F 17/00* (2006.01)
(52) U.S. Cl. ........ 707/615; 707/610; 707/640; 707/661; 707/809; 709/201; 709/248
(58) Field of Classification Search .................. 707/610, 707/640, 661, 809
See application file for complete search history.

(56) References Cited

U.S. PATENT DOCUMENTS

| | | | |
|---|---|---|---|
| 5,680,610 A | 10/1997 | Smith et al. | |
| 8,024,299 B2 * | 9/2011 | Dias et al. | 707/660 |
| 2004/0015600 A1 * | 1/2004 | Tiwary et al. | 709/234 |
| 2004/0221115 A1 * | 11/2004 | Sahin et al. | 711/154 |
| 2005/0131879 A1 * | 6/2005 | Ghosh et al. | 707/3 |
| 2005/0186975 A1 * | 8/2005 | Yach et al. | 455/466 |
| 2008/0097960 A1 * | 4/2008 | Dias et al. | 707/2 |
| 2008/0097961 A1 * | 4/2008 | Dias et al. | 707/2 |
| 2008/0097995 A1 * | 4/2008 | Dias et al. | 707/8 |
| 2008/0097996 A1 * | 4/2008 | Dias et al. | 707/8 |

(Continued)

FOREIGN PATENT DOCUMENTS

WO  WO 2008/051855  5/2008

OTHER PUBLICATIONS

Colle et al, "Oracle Database Replay", ACM, 2009.*

(Continued)

*Primary Examiner* — Hung Le
(74) *Attorney, Agent, or Firm* — Hickman Palermo Truong Becker Bingham Wong LLP; Adam C. Stone

(57) ABSTRACT

A database system providing transactionally consistent replay of application workloads. In a database system, a method providing transactionally consistent replay of application workloads comprises the steps of: during a replay phase in which a plurality of application requests that were previously submitted to an application server system during a capture phase are being replayed, receiving, at a database server, a database request to execute a database command against a database. The database request specifies an application request identifier that identifies a particular application request of the plurality of application requests. The particular application request caused the database command to be executed previously during the capture phase. In response to receiving the database request, determining, based on the application request identifier in the database request, whether to delay execution of the database command at least until a particular replay-phase database transaction has been committed.

27 Claims, 5 Drawing Sheets

U.S. PATENT DOCUMENTS

2008/0098003 A1* 4/2008 Dias et al. ............. 707/10
2010/0005097 A1* 1/2010 Liang et al. ............. 707/8

OTHER PUBLICATIONS

"Database Replay", Oracle White Paper, 2007.*
Galanis et al, "Oracle Database Replay", ACM. 2008, pp. 1159-1170.*

"Notification of Transmittal of the International Search Report and the Written Opinion of the International Searching Authority, or the Declaration" received in PCT application No. PCT/US12/23394 dated Mar. 23, 2012 (11 pages).
Current Claims in PCT application No. PCT/US12/23394 dated Mar. 2012 (4 pages).
U.S. Appl. No. 13/076,313, filed Mar. 30, 2011, Office Action, Mailing Date Jun. 5, 2012.

* cited by examiner

TRANSACTIONALLY CONSISTENT REPLAY OF APPLICATION WORKLOADS

CROSS-REFERENCE TO RELATED APPLICATION

The present application is related to application Ser. No. 11/800,238, filed May 3, 2007, entitled "Transactionally Consistent Database Workload Replay", the disclosure of which is hereby incorporated by reference in its entirety for all purposes.

FIELD OF THE INVENTION

The present invention relates generally to web application systems, and more particularly, to capturing a web application workload and replaying that workload in a transactionally consistent manner.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Large business-critical web applications are complex and experience highly varying load and usage patterns. These web applications are often expected to provide certain service guarantees in terms of response time, throughput, uptime, availability, etc. At times, it may be desirable make changes to a system, such as upgrading or modifying a configuration. However, before any change is made to a production system, extensive testing and validation should be performed in a test system. In order to be confident that a change will not cause problems (e.g., errors or performance issues) in the production system once that change is introduced into the production system, the web application in the test system should be exposed to an application workload that is very similar to the application workload that the web application in the production system would actually experience in a real world environment.

Previous testing approaches have been inadequate because none of these previous testing approaches reliably replicate a real production application workload in a test system in a transactionally consistent manner. Under one approach, test scenarios are generated manually and used in synthetic workloads. This approach often fails to reproduce the load patterns that would be experienced in an actual production environment.

According to another approach, application requests to a web application in a production system are programmatically captured and replayed against a web application in a test system, without any database-level synchronization. Although this approach can be useful for replicating a real production application workload, this approach does not provide adequate guarantee about the order of database transaction execution in the test system's database when the workload is replayed. For example, the occurrence of an error or performance issue observed in the production system may have depended on the order in which database transactions were executed in the production system. When the application workload is replayed against the web application in the test system, non-deterministic factors in the test system, such as timers, interrupts, network delays, CPU speeds, etc., may cause the execution order of database transactions in the test system to differ from the order in the production system.

For example, assume that, in the production system, the web application received two requests RQ1, and RQ2 that caused the web application to send three database commands to the database DBC1, DBC2 and DBC3 that were executed by the database in that order. When replayed, sending the same two requests RQ1 and RQ2 to the web application may cause those same three database commands to be sent to the database server, but in a different order (e.g. DBC2, DBC3 and DBC1). The order in which the database commands are executed may produce may have a significant effect both on performance of the system and on the outcome of the operations.

The possibility of producing outcomes during playback of a captured workload is problematic if a purpose for replaying the captured application workload against the test system is to diagnose or troubleshoot a problem observed in the production system. Thus, this approach is insufficient for accurately reproducing captured application workload in the test system.

What is needed is a solution that can replicate a real production application workload in a test system in a transactionally consistent manner. Such a solution should be implemented with underlying web application support so that the solution has little to no impact on existing web applications. Ideally, the solution should provide for transactionally consistent replay of an application workload without requiring changes to the database. The present invention fulfills these and other needs.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
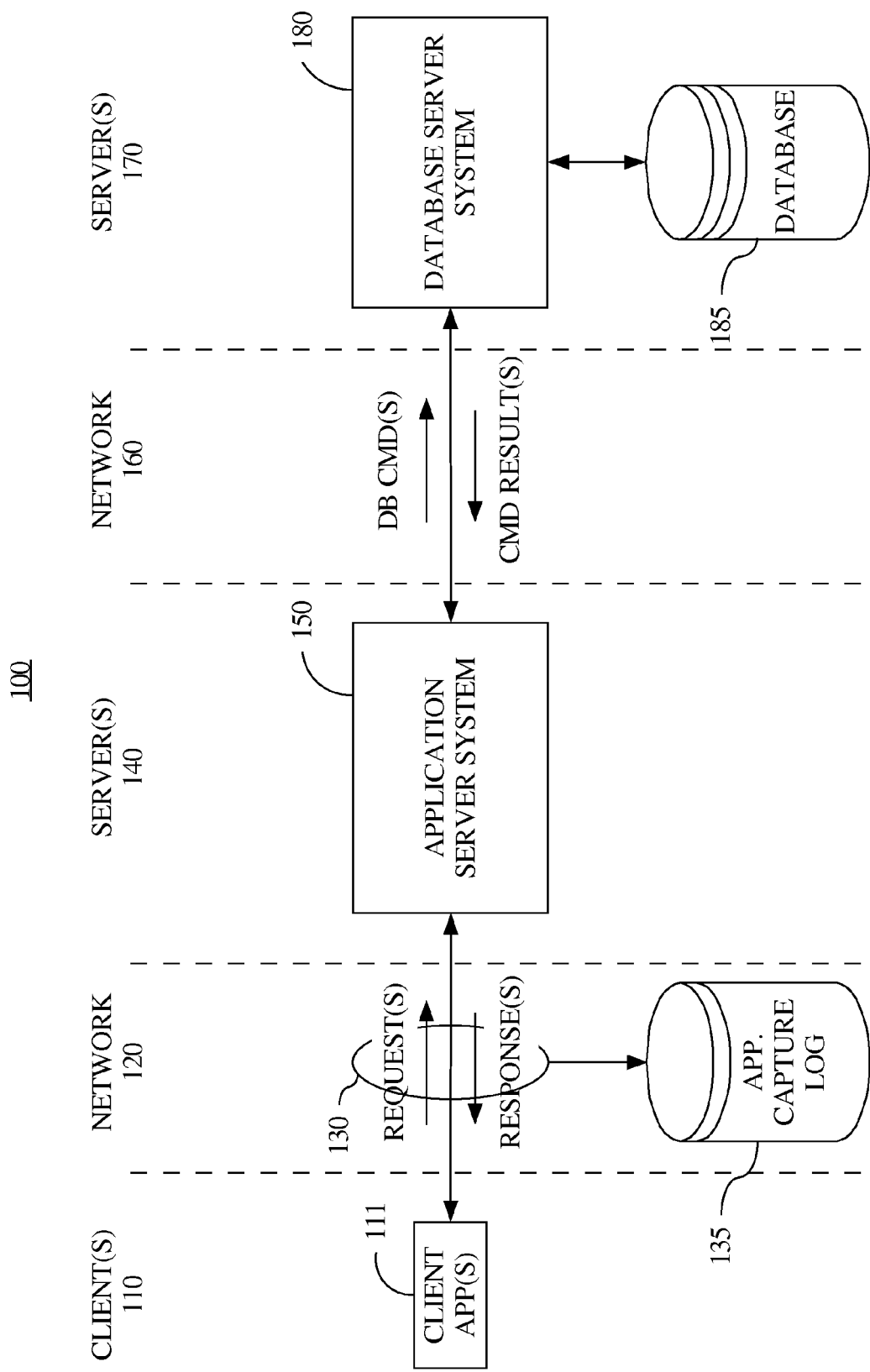
FIG. 1 illustrates the general structure of a multi-tier application workload capture system suitable for implementing embodiments of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described hereafter for obtaining transactionally consistent replay of application workloads. The techniques involve a capture phase, in which actual application workload is captured, and a replay phase. In the replay phase, application requests that were previously submitted to an application server system during the capture phase are replayed.

Basic operation of the system is as follows: during the capture phase, each application request received at a capture-phase application server system is assigned a unique application request identifier and that application request identifier is propagated by the capture-phase application server system in database requests that the application request causes to be sent to a capture-phase database server system. The assigned application request identifiers are captured along with the associated application requests by an application workload capture mechanism. Each database request received at the capture-phase database server system includes the application request identifier of the application request that caused the database request to be sent. A database replay capture mechanism in the capture-phase database server system captures transaction environment information about the database commands in the database request that were executed against the capture-phase database. In one embodiment, the transaction environment information comprises database sequence numbers assigned by the capture-phase database server system to the executed database commands. This captured transaction environment information is recorded in a database workload capture log in association with the application request identifier. Thus, during the capture phase, transaction environment information for each database command caused to be executed against the capture-phase database is linked, through an application request identifier, to the application request that caused the database command to be executed against the capture-phase database.

During the replay phase, the captured application workload is replayed against a replay-phase application server system. Each application request in the replayed workload includes the application request identifier assigned to the application request during the capture phase. Application request identifiers are propagated in database requests by the replay-phase application server system as was done by the capture-phase application server system during the capture phase. A replay-phase database server system uses the application request identifier propagated in a received database request to obtain captured transaction environment information for the database command(s) in the database request. The obtained transaction environment information is used by a database replay synchronization mechanism that operates in the replay-phase database server system to ensure that the database command(s) are executed against the replay-phase database in a manner that is transactionally consistent with the way the database commands were executed against the capture-phase database during the capture phase.

As mentioned above, techniques for performing transactionally consistent application workload replay are described herein. More particularly, a database replay synchronization mechanism is described which facilitates the task of ensuring that a captured application workload is replayed in a transactionally consistent manner. The system provides transactionally consistent replay of an application workload by linking, during the capture phase, at the database server system-level, (a) captured information about the transaction environment in which database commands execute to (b) the application requests that cause those database commands to be executed, in order to provide an application workload capture and replay solution that does not require the application server system to capture or operate upon the captured transaction environment information.

For example, assume during the capture phase an application request AREQ1 caused database command DBCMD1 to be executed against the capture-phase database and that DBCMD1 was assigned database sequence number DBSEQ (e.g., transaction environment information) by the capture-phase database server system. Under these circumstances, the database replay capture mechanism in the capture-phase database server system would store data during the capture phase that links AREQ1, DBCMD1, and DBSEQ. In particular, the system would obtain and store the data in a way that does not require the capture-phase application server system to obtain and store database sequence number DBSEQ. Similarly, during the replay phase in which application request AREQ1 is replayed to the replay-phase application server system, transactionally consistent execution of database command DBCMD1 would be ensured by the database replay synchronization mechanism in the replay-phase database server system without requiring the replay-phase application server system to operate upon or otherwise have "knowledge" about database sequence number DBSEQ.

The transactionally consistent capture and replay system described herein provides a solution that preserves concurrency characteristics of the captured application workload within the database when the workload is replayed. The solution performs synchronization of replayed database commands at the database server system level instead of at the application server system level, thereby providing an accurate reproduction of the transactional characteristics of the application workload. Such database server system-level synchronization prevents replayed application requests from failing due to database data inconsistencies between capture and replay. The present solution uses a commit point ordering technique to provide a transactionally consistent replay of an application workload that minimizes constraints on the concurrency of the replayed workload.

Application Workload Capture and Replay System

The techniques described herein may be performed by a single computer (e.g., the computer system 500 of FIG. 5), or in a multi-tier application workload capture and replay system. Such a multi-tier web application workload capture and replay system may include, for example, an application server, a database management server, and a database.

Figure 2:
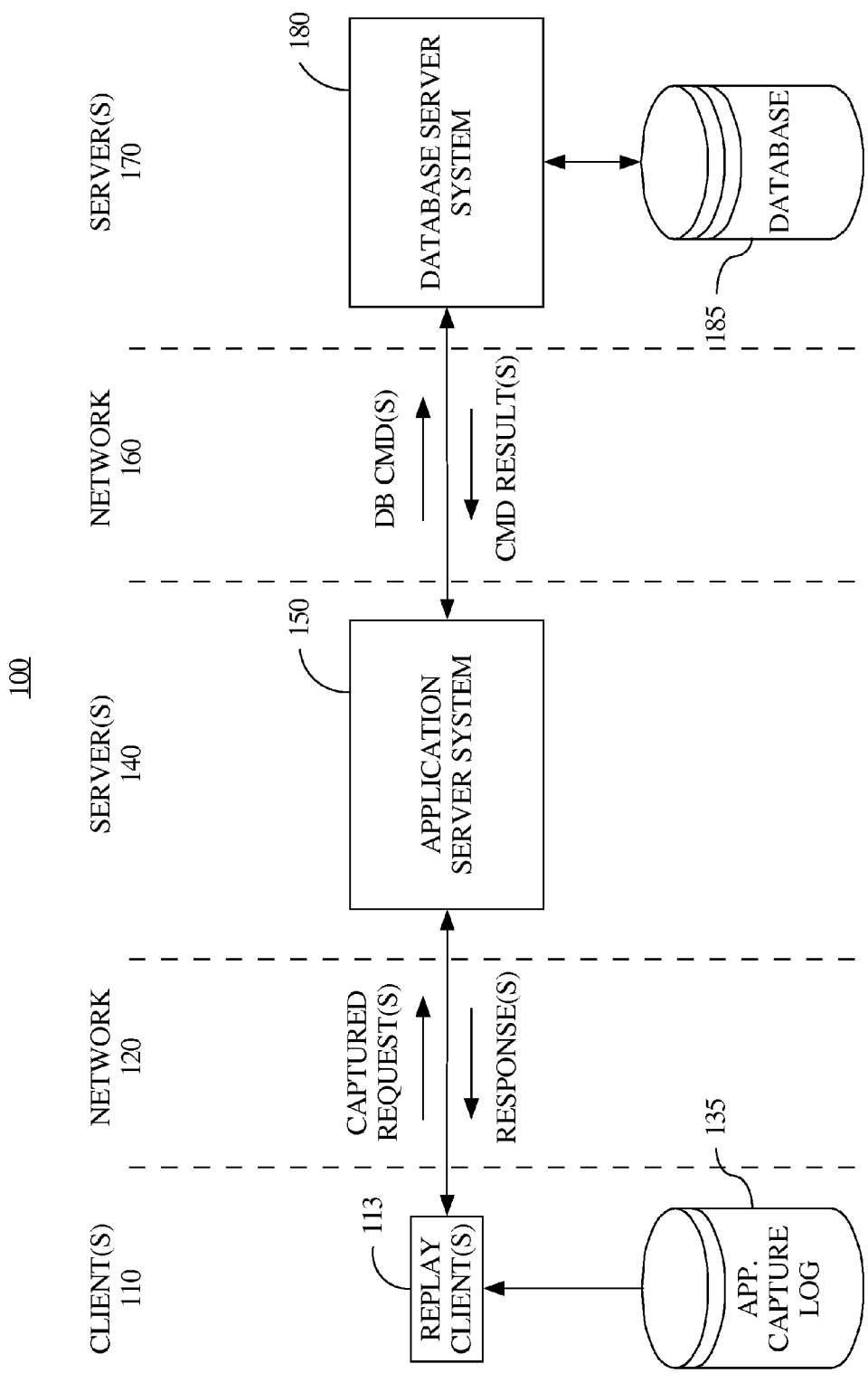
FIG. 2 illustrates the general structure of a multi-tier application workload replay system suitable for implementing embodiments of the present invention.

FIGS. 1 and 2 illustrate, in two different configurations respectively, the general structure of a multi-tier application workload capture and replay system 100 suitable for implementing the capture and playback techniques described herein. FIG. 1 illustrates the general structure of the system 100 configured for an application workload capture phase. FIG. 2 illustrates the general structure of the system 100 configured for an application workload replay phase. As shown in FIG. 1, during the capture phase, an application workload is captured by one or more application workload capture process(es) 130 and stored in one or more application workload capture log(s) 135. As shown in FIG. 2, during the replay phase, data in the capture log(s) 135 is used by one or more replay client(s) 113 to subject the system 100 to the captured application workload.

While, in one embodiment, the replay and capture phases may occur in the context of a single instance of the system 100, in other embodiments the replay and capture phases occur in the context of separate instances of the system 100 respectively. For example, the capture phase may occur in the context of the system 100 deployed in a data center or other production facility, while the replay phase may occur in the context of the system 100 deployed on a lab environment or other test facility.

As shown, system 100 comprises one or more client(s) 110 connected to one or more server(s) 140 via a network 120, the one or more server(s) 140, in turn, are connected to one or more sever(s) 170 via a network 160. Specifically, during the capture phase, the client(s) 110 comprise one or more standalone client application(s) 111 connected to an application server system 150 using a conventional network. During the replay phase, the client(s) 110 comprise one or more standalone application replay client(s) 113 connected to the application server system 150 using a conventional network. The server(s) 140 comprise the application server system 150 connected to a database server system 180 using a conventional network such as a Local Area Network (LAN).

In an exemplary embodiment, the client application(s) 111 and the application replay client(s) 113 are embodied in one or more client computing devices. For example, a client application 111 might be a web browsing application ("browser") executing on a personal computing device such as a desktop computer or smart phone. An application replay client 113 might be, for example, a browser simulator program or other computer application for simulating functionality of a client application 111.

The application server system 150 generally operates as one or more processes independent of the client application(s) 111, application replay client(s) 113, and the database server system 180. The database server system 180 generally operates as one or more processes independent of the client application(s), application replay client(s) 113, and the application server system 150.

In one embodiment, application server system 150 may be implemented using Oracle® Application Server Portal, and database server system 180 may be implemented using Oracle® Database. However, these are merely examples of software programs that may be used to implement embodiments of the invention, and the techniques herein are not limited to any particular software programs.

The networks 120 and 160 may comprise one or more conventional network systems, including a Local Area Network (LAN) or a Wide Area Network (WAN), as is known in the art. During the capture phase, the network 120 includes functionality for packaging application request(s) and application response(s) in accordance with a well-known application-level network protocol (e.g., the Hyper-Text Transfer Protocol (HTTP)) together with any payload or parameter information into one or more data packets sent between the client application(s) 111 and the application server system 150. During the replay phase, the network 120 includes functionality for packaging application request(s) and application response(s) in accordance with a well-known application-level network protocol (e.g., the Hyper-Text Transfer Protocol (HTTP)) together with any payload or parameter information into one or more data packets sent between the replay client(s) 113 and the application server system 150. The network 160 includes functionality for packaging database command(s) and database command result(s) in a well-known data manipulation language (e.g., the Structured Query Language (SQL)) together with any parameter information into one or more data packets sent between the application server system 150 and the database server system 180.

Handling Requests Sent to the Application Server System

To facilitate concurrent handling of application requests from the client application(s) 111 and the replay client(s) 113, each application request may be handled within the application server system 150 in its own separate "thread" of execution that can concurrently execute with other threads within the application server system 150. Thus, at any given time, the application server system 150 may be concurrently handling multiple application requests.

In handling application requests from the client application(s) 111 and the replay client(s) 113, the application server system 150 might retrieve data from and/or store data to database 185. To accomplish this, the application server system 150 may establish and maintain a pool of network connections with the database server system 180. A connection in the pool may be re-used for multiple database requests.

Within the context of handling an application request, the application server system 150 sends one or more database requests to the database server system 180. Each database request sent from the application server system 150 may comprise one or more database commands. Such database commands may include Structured Query Language (SQL) statements, for example. SQL statements may be separated generally into two categories: data manipulation language (DML) statements for reading and writing data and conducting database transactions; and data definition language (DDL) statements for describing and maintaining the database. Examples of DML SQL statements include SELECT, UPDATE, INSERT, DELETE, BEGIN TRANSACTION, COMMIT TRANSACTION, etc. Examples of DDL SQL statements include CREATE TABLE, CREATE INDEX, etc. Thus, an application request sent by a client application 111 or a replay client 113 to the application server system 150 may cause the application server system 150 to send one or more database requests, each request comprising one or more database commands to be executed against the database 185. Transitively, an application request may cause one or more database commands to be executed against the database 185.

Handling Requests Sent to the Database Server

The database server system 180 executes these database commands relative to a database 185. As a result of the executing these database commands, the database server system 180 may store data in, and/or retrieve data from, the database 185. The database server system 180 may execute two or more database commands in a transactional manner, so that none of the effects of the database commands in a single transaction are made permanent in the database 185 unless all of the effects of those database commands can be made permanent.

To facilitate concurrent handling of database requests from the application server system 150, each database request may be handled within the database server system 180 in its own separate "thread" of execution that can concurrently execute with other threads within the database server system 150. Thus, at any given time, the database server system 180 may be concurrently handling multiple database requests and concurrently executing multiple database commands.

The database server system 180 may maintain a logical clock to uniquely identify versions of the database 185. In one embodiment, the logical clock is a sequence number that the database server system 180 increments each time changes to the database 185 are made permanent. In one embodiment, the database server system 180 increments the sequence number each time a transaction is committed to the database 185. Thus, in one embodiment, each version of the database 185 may be uniquely identified by the logical clock sequence number assigned by the database server system 180 to the committed transaction that resulted in the version of the database 185, referred to hereinafter as the version's database sequence number. Database sequence numbers assigned to different versions of the database 185 may be numerically compared to determine the order of the versions in time (e.g., to determine whether one version happened before or happened after another version). In one embodiment, numerically greater database sequence numbers indicate later-occurring database versions than are indicated by the numerically lesser database sequence numbers that precede them. In one embodiment, a database sequence number assigned by the database server system 180 to a version of the database 185 is a combination of multiple database sequence numbers. For example, a database sequence number may be a combination of a 32-bit base sequence number and a 16-bit overflow sequence number.

The database server system 180 may return, to the application server system 150, data retrieved from the database 185 as a result of the execution of certain database commands (e.g., SQL select statements). The application server system 150 may use such retrieved data in forming responses to application request(s) from the client application(s) 111 and the replay client(s) 113.

The Capture Phase

During the capture phase, the network 120 includes the application workload capture process(es) 130. The application workload capture process(es) 130 may be implemented as one or more separate concurrently executing processes or as one or more concurrently executing threads of the same process, for example. In one embodiment, the capture process(es) 130 collectively, transparently, and non-intrusively capture all workload that the application server system 150 receives during the capture phase from external entities (e.g., client application(s) 111). In an exemplary embodiment, a network packet sniffer or network protocol analyzer is used to capture the application workload.

In one embodiment, an application workload comprises one or more application request(s) originating from one or more client application(s) 111 or one or more other process(es) external to the application server system 150. The capture process(es) 130 store and record this workload as data in a application workload capture log 135. As a result, the captured workload may comprise workload that was captured during a particular interval of time. In one embodiment, the capture phase corresponds to this particular interval of time. In one embodiment of the invention, the captured workload represents actual real-world use of the application server system 150, which use is not specifically for any testing purpose.

Post-Capture Processing

After the capture process(es) 130 have stored workload in captured workload log 135, captured workload log 135 may undergo post-capture processing. This processing may be performed in a non-real-time manner. For example, after the capture process(es) 130 have finished storing data in the captured workload log 135, other processes may process the stored data. In one embodiment, this post-capture processing is performed in between the capture phase and the replay phase. In one embodiment, this post-capture processing includes converting captured workload 135 to a different data format. For example, the captured workload 135 may be converted from raw network packet data to eXtensible Markup Language (XML) formatted data.

The Replay Phase

In one embodiment, after the captured application workload log 135 has undergone post-capture processing as discussed above, one or more replay clients 113 read the processed workload from captured workload 135 and send that processed workload to the application server system 150. Replay client(s) 113 may be implemented as one or more separate concurrently executing processes or as one or more concurrently executing threads of the same process, for example. In sending the processed workload to the application server system 150, replay client(s) 113 subject the application server system 150 to the same application workload to which client application(s) 111 subjected the application server system 150 during the capture phase.

In one embodiment of the invention, replay client(s) 113 synchronize the sending of captured request(s) that they send to the application server system 150 so that the differences in time between the application server system's 150 receipt of those captured request(s) corresponds to the differences in time between the application server system's 150 previous receipt of those same request(s) during the capture phase. Thus, in one embodiment of the invention, the duration of the interval of time during which replay client(s) 113 send captured request(s) to the application server system 150 is identical to the duration of the interval of time during which client application(s) 111 sent those same request(s) to the application server system 150 during the capture phase.

Each of replay client(s) 113 can replay workload that was captured by multiple separate capture processes 130. Therefore, there may be fewer replay client(s) 113 than capture processes 130. Each of replay client(s) 113 may be multi-threaded.

While in some embodiments the same application server system 150 is used in both the capture and replay phases, in other embodiments the application server system 150 used during the replay phase ("replay-phase application server system") is different in one or more respects from the application server system 150 used during the capture phase ("capture-phase application server system"). For example, the replay-phase application server system 150 might be an upgraded version of the capture-phase application server system 150. For another example, the replay-phase application server system 150 might be the same brand and version of the capture-phase application server system 150, but the replay-phase application server system 150 might be configured differently (e.g., in one or more settings) from the capture-phase application server system 150. For yet another example, the replay-phase application server system 150 might be an entirely different brand of application server system from the capture-phase application server system 150. The replay-phase application server system 150 might execute on a machine that has different hardware than the hardware of the machine on which the capture-phase application server system 150 executes. The replay-phase application server system 150 might execute in conjunction with a different operating system than the operating system in conjunction with which the capture-phase application server system 150 executes. The purpose of subjecting the replay-phase application server system 150 to the same workload as that to which the capture-phase application server system 150 was actually subjected may be to determine whether the difference between the replay-phase application server system 150 and the capture-phase application server system 150, and/or the difference in the environments in which those application server systems execute, is a permissible or desirable difference.

While in some embodiments the same database server system 180 is used in both the capture and replay phase, in other embodiments the database server system 180 used during the replay phase ("replay-phase database server system") is different in one or more respects from the database server system 180 used during the capture phase ("capture-phase database server system"). For example, the replay-phase database server system 180 might be an upgraded version of the capture-phase database server system 180. For another example, the replay-phase database server system 180 might be the same brand and version of the capture-phase database server system 180, but the replay-phase database server system 180 might be configured differently (e.g., in one or more settings) from the capture-phase database server system 180. For yet another example, the replay-phase database server system 180 might be an entirely different brand of database server from the capture-phase database server system 180. The replay-phase database server system 180 might execute on a machine that has different hardware than the hardware of the machine on which the capture-phase database server system executes 180. The replay-phase database server system 180 might execute in conjunction with a different operating system than the operating system in conjunction with which the capture-phase database server system 180 executes. The purpose of subjecting the replay-phase application server system 150 to the same workload as that to which the capture-phase application server system 150 was actually subjected may be to determine whether the difference between the replay-phase database server system 180 and the capture-phase database server system 180, and/or the difference in the environments in which those database servers execute, is a permissible or desirable difference.

While in some embodiments the same database 185 is used during both the capture and replay phases, in other embodiments the database 185 used during the capture phase ("capture-phase database") is different in one or more respects from the database 185 used during the replay phase ("replay-phase database"). For example, the manner in which logical relational database structures are physically laid out and stored on disk in the replay-phase database 185 might differ from the manner in such logical relational database structures are physically laid out and stored on disk in the capture-phase database 185. Thus, although the values present in the data that is stored in the capture-phase database 185 will be the same as the values present in the data that is stored in the replay-phase database 185, the manner in which those values are stored on disk may differ between the two databases. Additionally, the manner in which relational tables are partitioned in the replay-phase database 185 may differ from the manner in which corresponding relational tables are partitioned in the capture-phase database 185. Additionally, indices that are (or are not) constructed for relational tables in the replay-phase database 185 may differ from indices that are (or are not) constructed for corresponding relational tables in the capture-phase database 185. The purpose of subjecting the replay-phase application server system 150 to the same application workload as that to which the capture-phase application server system 150 actually was subjected may be to determine whether the difference between the replay-phase database 185 and production database 112 is a permissible or desirable difference. Typically, the replay-phase database 185 is not merely a backup, mirror, or fail-over of the capture-phase database 185.

The Initial State of the Replay Phase

The capture phase may begin at a time at which the capture-phase database 185 is already in a certain state. For example, at the time that the capture phase begins, the capture-phase database 185 might already contain one or more logical data structures (e.g., database tables, stored procedures, triggers, views, indices, etc.) which might already be populated with data. If the replay-phase database 185 does not also contain these structures by the time that the replay client(s) 113 begin to "replay" the captured application workload 135 to, then the execution of database commands during the replay phase relative to the replay-phase database 185 might produce errors.

Therefore, in one embodiment, before the replay client(s) 113 begin to replay the captured application workload 135 to the replay-phase application server system 150, the replay-phase database 185 is placed in the same logical state that the capture-phase database 185 was at when the capture-phase commenced. This may be accomplished by "backing up" the capture-phase database 185 just prior to the capture phase and performing a restore, from the resulting backup data, to the replay-phase database 185, for example.

Replay Phase Timing

The time interval during which replay client(s) 113 replay captured application workload 135 to the replay-phase application server system 150 may be completely non-overlapping and non-concurrent with the time interval during which the capture process(es) 130 intercept and store that workload. For example, the capture process(es) 130 might intercept and record the application workload 135 during a first time interval. Hours, days, or even weeks after the end of that first time interval, the replay client(s) 113 might replay the captured application workload 150 to the replay-phase application server system 150 during a second time interval that is not concurrent with any part of the first time interval.

The above-described multi-tier application workload capture and replay system is presented for the purposes of illustrating the basic underlying system components that may be employed for implementing embodiments of the invention. For purposes of discussion, the following description will present examples in the context of system 100. The present invention, however, is not limited to the system 100. Instead, embodiments of the present invention may be implemented in any type of system or processing environment capable of supporting the embodiments presented in detail below.

System Modifications for Transactionally-Consistent Application Workload Replay

Figure 3:
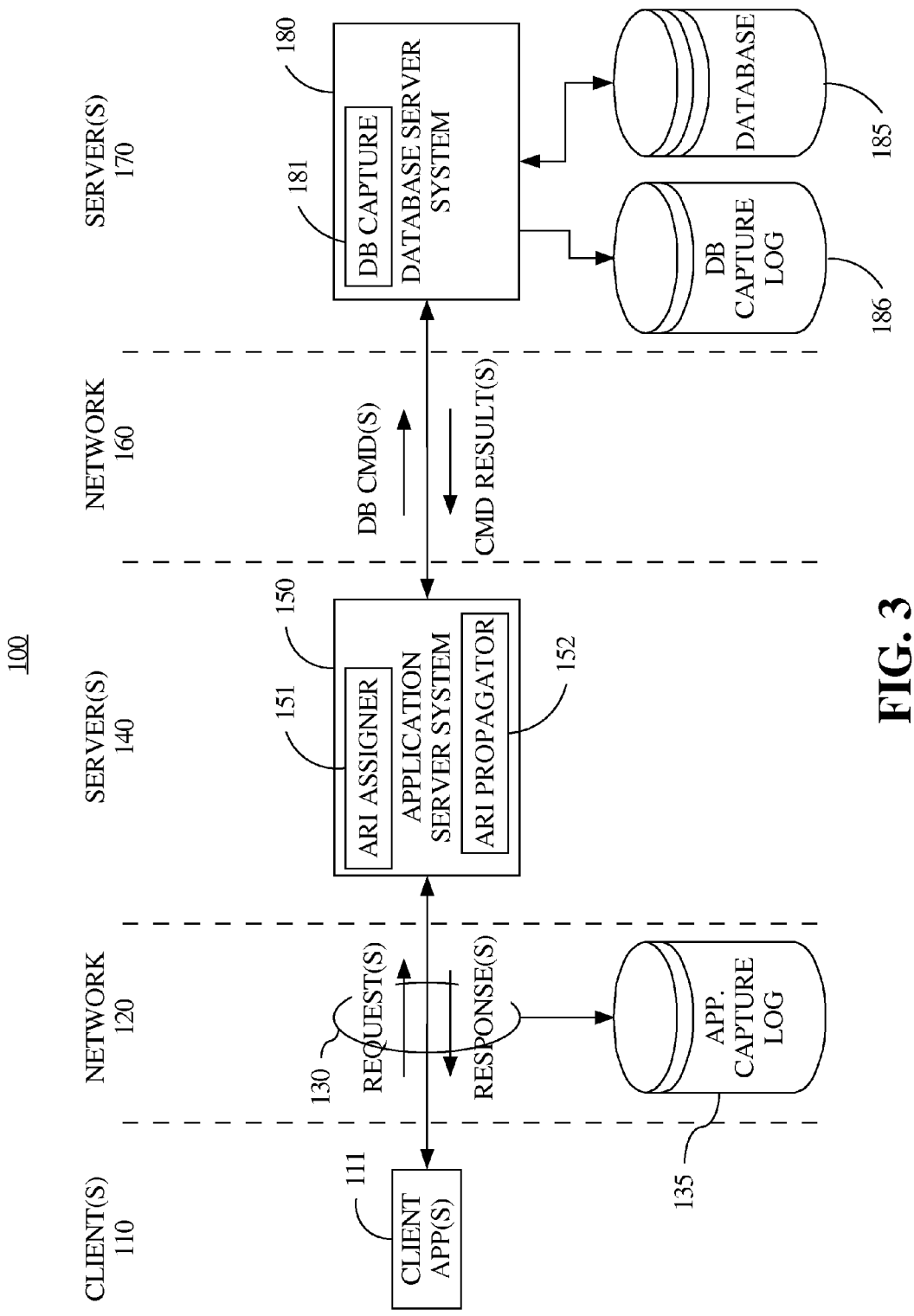
FIG. 3 is a block diagram showing specific enhancements to the capture system of FIG. 1 for providing a transactionally consistent replay of an application workload during a capture phase.
Figure 4:
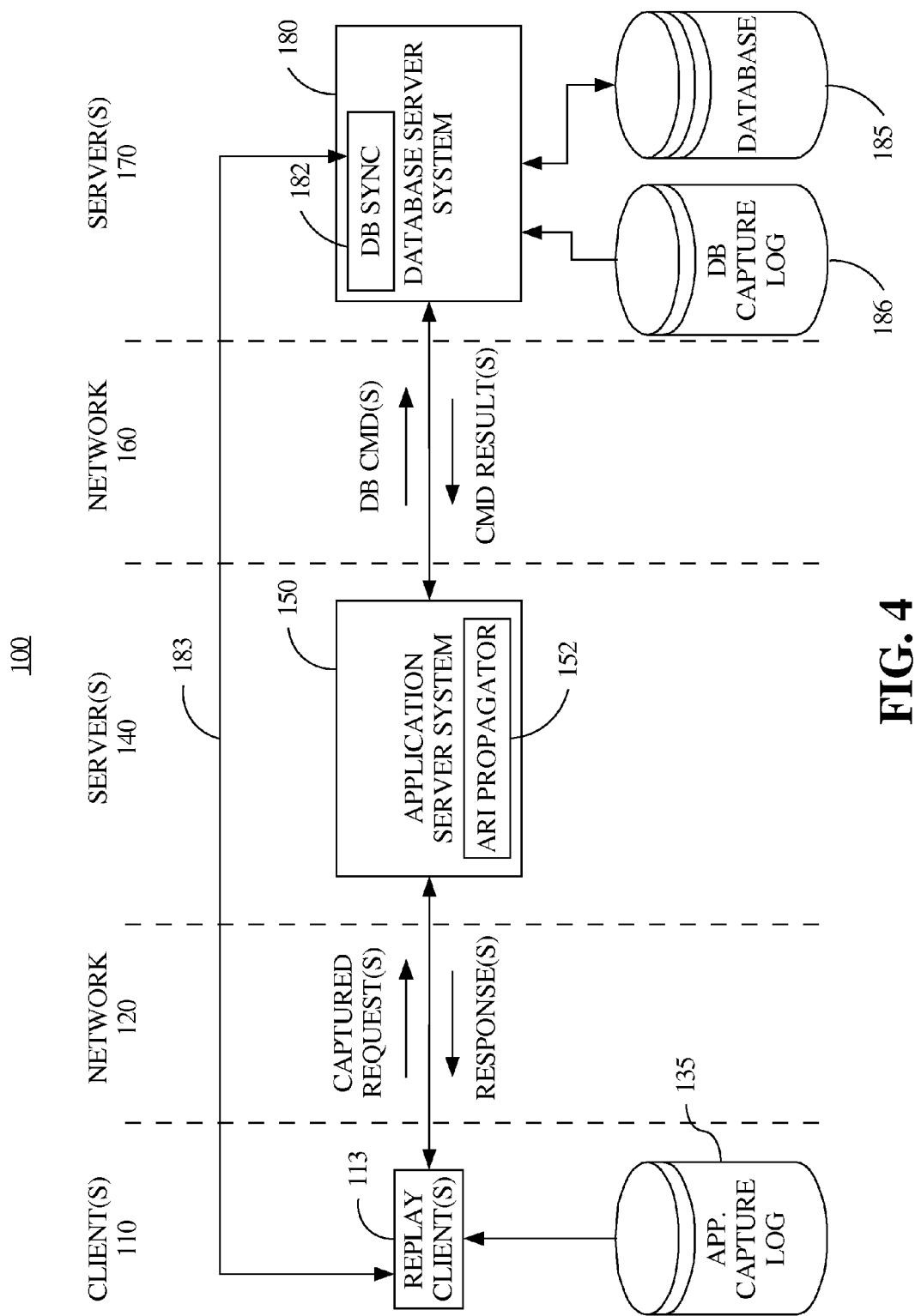
FIG. 4 is a block diagram showing specific enhancements to the replay system of FIG. 2 for providing a transactionally consistent replay of an application workload during a replay phase.

FIG. 3 is a block diagram showing specific enhancements to the capture system of FIG. 1 for ensuring a transactionally consistent replay of an application workload during a capture phase. FIG. 4 is a block diagram showing specific enhancements to the replay system of FIG. 2 for ensuring a transactionally consistent replay of an application workload during a replay phase. In one embodiment, functionality for ensuring a transactionally consistent replay of an application workload is implemented by incorporating the following additions.

Application Request Identifier (ARI) Assigner

According to one embodiment, the capture-phase application server system 150 is modified to include an application request identifier assigner module 151 for assigning a unique application request identifier to each incoming application request received at the capture-phase application server system 150. Preferably, such assignment is handled by the capture-phase application server system 150 itself, and does not require modifications to or customized logic in the applications executing on the capture-phase application server system 150. In one embodiment, an application request identifier is unique amongst all application requests assigned an application request identifier by the capture-phase application server system 150 in a certain period of time. For example, an application request identifier assigned to an application request may be unique amongst all application requests assigned an application request identifier by the capture-phase application server system 150 during a particular capture phase.

In one embodiment in which the capture-phase application server system 150 is a web application server system, each incoming HTTP request received at the capture-phase application server system 150 is assigned a unique application request identifier. More particularly, before the incoming HTTP request is handed off by the capture-phase application server system 150 to an application for further request handling, the ARI Assigner 151 generates a unique application request identifier for the incoming HTTP request. The generated application request identifier is set by the ARI Assigner 151 as a HTTP request header in the HTTP request such that the incoming HTTP request appears to downstream request processing within the capture-phase application server system 150 as if the HTTP request header was set by the client application 111 that originated the HTTP request. For example, the ARI Assigner 151 might be implemented as part of pre-request handling component of the capture-phase application server system 150 that processes incoming HTTP requests before they are handed off to an application executing on the capture-phase application server system 150 for further request handling. In an exemplary embodiment in which the application server system 150 comprises Oracle® Application Server Portal, the HTTP request header takes the following format:

Oracle-ECID: request_id, sequence_number

In the above-example format, the request_id is a 64-bit unique integer for the HTTP request assigned by the ARI Assigner 151, and the sequence_number is a hop number as the request passes through the Oracle® Application Server Portal. Typically, an Oracle® Application Server Web Cache component assigns an initial sequence_number of 0 to a request. As the HTTP request passes from the Oracle® Application Server Web Cache component to other Oracle® Application Server components, the request_id remains constant, but the sequence number increments with each hop.

In an embodiment, the ARI Assigner 151 also sets the application request identifier assigned to an incoming application request in the outgoing response to the application request.

In one embodiment, in which the capture-phase application server system 150 is a web application server system, the application request identifier assigned to an incoming HTTP request is set by the ARI Assigner 151 as diagnostic information in the Server response field of the outgoing HTTP response to the HTTP request. The following is an example a Server response field containing an application request identifier of 23248098121:

Server: Oracle-Application-Server 10g/10.1.2 Oracle-HTTP-Server OracleAS-Web-Cache-10g/10.1.2.0.0 (TH; max-age=60+30;age=55;ecid=23248098121,0)

In the above example Server response field, the diagnostic parameter ecid=23248098121,0 specifies an application request identifier of 23248098121 and a hop sequence number of 0. In the exemplary embodiment, 23248098121 was the application request identifier assigned by the ARI Assigner 151 to the HTTP request to which the HTTP response containing this Server response field is the response to.

In one embodiment, the ARI Assigner 151 is implemented using an application request and response handling "hook". In this implementation, that capture-phase application server system calls or invokes the ARI Assigner 151 for each application request received at the capture-phase application server system prior to an application hosted by the application server system 150 handling the incoming request. This provides the ARI Assigner 151 the opportunity to generate a unique application request identifier for the incoming application request and set the application request identifier in request data (e.g., as an HTTP request header) where it is available to other components and modules of the capture-phase application server system 150. The capture-phase application server also calls or invokes the ARI Assigner 151 after an application has handled the incoming request but before a complete response to the incoming request is sent over a network from the capture-phase application server system 150. This post-request handling invocation of the ARI Assigner 151 by the capture-phase application server system 150 provides the ARI Assigner 151 the opportunity to set the application request identifier assigned to the incoming request in the response sent out over the network (e.g., in the HTTP response). The ARI Assigner 151 may maintain the assigned application request identifier between the pre-request handling invocation and the post-request handling invocation in a per-request memory of the capture-phase application server system 150 (e.g., in a thread-specific memory area or memory specifically allocated for handling the request).

In one embodiment, as part of post-capture processing of application workload capture log 135, data of each captured application response is parsed. The captured response data is parsed for the application request identifier that was set in the response when sent from the capture-phase application server system. That application request identifier is then set, in the application workload capture log 135, in the data of the corresponding captured application request that caused the response during the capture phase.

For example, in an embodiment in which captured application requests and responses conform to the HTTP protocol, each HTTP response captured in the application workload capture log 135 is parsed to locate the application request identifier, which is located in a pre-specified location within the response. For example, the application request identifier may be stored as diagnostic information in the Server response field. The application request identifier extracted from the HTTP response is then set in the application workload capture log 135 as a request header in the corresponding captured HTTP request (i.e., the HTTP request that caused the HTTP response from which the application request identifier was extracted). In other words, the data of the captured HTTP request in the application workload capture log 135 is modified to add the request header specifying the extracted application request identifier. In this way, even though the originally captured HTTP requests did not include application request identifiers, the processed captured HTTP requests will include their assigned application request identifiers when replayed during the replay phase.

In an embodiment in which a capture-phase application server system 150 is also used as the replay-phase application server system 150, the ARI Assigner 151 is configured to detect whether an incoming application request already contains an application request identifier. If so, the ARI Assigner 151 does not assign a new application request identifier to the incoming application request. In this way, the application request identifiers assigned to captured application requests during the capture phase are preserved when those captured application requests are replayed during the replay phase.

Application Request Identifier (ARI) Propagator

Also shown, both the capture-phase application server system 150 and the replay-phase application server system 150 are modified to include an application request identifier propagator 152. The ARI propagator 152 propagates the application request identifier for an incoming application request in each database request that is caused by the incoming application request. According to one embodiment, the application request identifier is propagated to the database server system by the application server system modifying an "application context" data structure in the database server system prior to issuing the database request to the database server system. For example, the application server system may embed a "SetApplicationContext" command in the database request sent to the database server system. The application context is set to include the application request identifier of the application request causing the database request. Preferably, propagation of application request identifiers is handled by the application server system 150 itself, and does not require modifications to or customized logic in the applications executing on the capture-phase application server system 150.

In the context of handling an application request, an application executing on the application server system 150 may invoke a database interface module of the application server system 150 for the purpose of sending one or more database requests to the database server system 180. In this context, the ARI propagator 152 ensures that the application request identifier assigned to the application request is included in each of the one or more database requests, caused by the application request, to be sent to the database server system 180. When database request(s) are made by an application in the context of handling an application request, the ARI propagator 152 accesses per-application request context information to obtain the application request identifier for the application request. The ARI propagator 152 sets the application request identifier in the database request(s) sent to the database server system 180 along with the database commands that are part of the database request(s). For example, the ARI propagator 152 may embedded the application request identifier in a "SetApplicationContext" call in the database request sent to the database server system. In an embodiment, propagation of the application request identifier to the database server system 180 by the ARI propagator 152 occurs transparently and non-intrusively to the application handling the application request.

Database Replay Capture Mechanism and Database Replay Synchronization Mechanism

Also shown, the capture-phase database server system 180 is modified to include a database replay capture mechanism 181. The replay-phase database server system 180 is modified to include a database replay synchronization mechanism 182. If the same database server system 180 is used during the capture and replay phases, then that database server system 180 is modified to include both the database replay capture mechanism 181 and the database replay synchronization mechanism 181.

As described above, a database request received at the capture-phase database server system 180 during the capture phase will include the application request identifier of the application request that caused the capture-phase application server system 150 to send the database request to the capture-phase database server system 180. The database request may also include one or more database commands to be executed against the capture-phase database 185.

Capturing the Transactional Environment

Each database command executes in the context of a "transactional environment". The transactional environment in which a database command executes dictates which version of the database the database command "sees" when the database command is executed against the database.

For example, in system 100, a first database request from the capture-phase application server system 150 to the capture-phase database server system 180 might include database commands in the context of a first transaction at the same time that a second database request includes database commands in the context of a second transaction. The first transaction might include a SQL command, "INSERT INTO T1 VALUES ('A')." The second transaction might include a SQL command, "SELECT*FROM T1." This "SELECT" command might execute after the "INSERT" command has been executed. Under such circumstances, the "SELECT" command in the second transaction should not see the insertion of the value "A" into table "T1" unless the first transaction has been committed. If the "SELECT" command executes before the first transaction has been committed, then the "SELECT" statement should not see the first transaction's effects on table "T1."

To ensure that no transaction should see the effects of another transaction that has not yet committed, a database sequence number may be assigned to each database command. Each database sequence number reflects the transaction environment in whose context the corresponding database command should be processed. In one sense, each database sequence number signifies a "snapshot" of the database state. A database sequence number is a "logical time value" that reflects the state of the database that should be visible to the corresponding command when that command is executed or otherwise processed. In one embodiment of the invention, higher database sequence numbers indicate later-occurring database states than are indicated by the lower database sequence numbers that precede them. However, it is possible for multiple database commands to have the same database sequence numbers.

In one embodiment, among other information that is captured during the capture phase by the database replay capture mechanism 181, information about the "transactional environment" for each database command executed against the capture-phase database 185 is captured. The captured transactional environment information is stored in conjunction with the application request identifier included in the database request that contained the database command.

In one embodiment of the capture phase, database sequence numbers assigned to database commands are captured by the database replay capture mechanism 181 and stored in a database workload capture log 186. The database capture log 186 may be part of the database 185. For example, the database capture log 186 may be a table in the database 185. In such case where the database capture log 186 is part of the database 185, transaction environment information for database commands executed against the database capture log 186 may not be captured by the database capture mechanism 181. All or a portion of the database capture log 186 may be outside the database 185. For example, the database capture log 186 may be an XML file.

In one embodiment, for a database command received in a database request by the capture-phase database server system 180, the database replay capture mechanism 181 records, in the database workload log 186, (a) data representing the database command (e.g., the text of the SQL statement), (b) one or more database sequence numbers assigned to the database command that reflect the capture phase transaction environment in which the database command was executed, and (c) the application request identifier included in the database request that contained the database command. Thus, the recorded transaction environment information for a database command—and which is used during the replay phase to synchronize execution of the database command—is linked to the captured application request that caused the database command to be executed.

Database Requests With More Than One Database Command

Any given database request may include multiple database commands specified in the order in which they are to be executed. For example, a database request may comprise a database command to begin a transaction followed by one or more database commands to read/modify database data, which are followed by a final database command to commit the transaction to the database. In one embodiment, information recorded in the database workload log 186 for multiple database commands in a database request reflects the specified execution order of the multiple database commands. For example, information for each of the multiple database commands may be recorded in the database workload log 186 in order of the specified execution order.

When replay client(s) 113 replay captured application workload 135 to the replay-phase application server system 150, the database replay synchronization mechanism 182 maps application request identifiers in database requests received at the replay-phase database server system 180 to database sequence numbers contained within the captured database workload 186 and uses the mapped database sequence numbers to ensure transactional consistency. Referring to the example discussed above, if the "SELECT" command of the second transaction was unable to see the effects of the first transaction when the "SELECT" command was executed relative to the capture-phase database 185, then the presence of the database sequence number in the captured database workload 186 causes the database replay synchronization mechanism 182 to ensure that the "SELECT" command also will be unable to see the effects of the first transaction when the "SELECT" command is executed relative to the replay-phase database 185. When the database replay synchronization mechanism 182 maps an application request identifier to a database sequence number for a database command, the replay-phase database server system 180 abides by the database sequence number when scheduling the database command for execution against the replay phase database 185.

Disambiguating Transaction Environment Information

A database request received at the replay phase database server system 180 may have multiple database commands. For example, a single database request DBRQ1 may have three database commands DC1, DC2, DC3.

In this case, the application request identifier by itself does not uniquely identify captured transaction environment information for a database command of the multiple database commands. In one embodiment, the database replay synchronization mechanism 182 disambiguates captured transaction environment information associated with a particular application request identifier by comparing the text of a received database command with the text of database commands associated with the particular application request identifier as recorded in the database workload capture log 186. In this way, each of multiple database commands for a particular application request identifier can be associated with its corresponding captured transaction environment information.

In another embodiment, the database replay synchronization mechanism 182 assumes that database commands for a particular application request identifier are received at the replay phase database server system 180 during the replay phase in the same order they were received at the capture phase database server system 180 during the capture phase. This latter order may be reflected by the order in which transaction environment information for the multiple database commands is stored in the database workload capture log 186. In this embodiment, when a database command associated with a particular application request identifier is received at the replay phase database server system 180, the database replay synchronization mechanism 182 identifies, based on information in the database workload capture log 186, the next captured transaction environment information for the particular application request identifier in order to associate with the received database command. In one embodiment, a combination of these two techniques is used for disambiguation purposes.

Commit and Non-Commit Actions

In one embodiment of the invention, the database replay capture mechanism 181 categorizes all database commands executed during the capture phase as either "commit actions" or "non-commit actions." Any database command whose execution causes an entire transaction's effects on the database 185 to be made permanent (i.e., "committed") in the database 185 is a commit action. All other database commands are non-commit actions. For example, execution of a SQL COMMIT command that permanently changes the state of the database is a commit action. All queries are non-commit actions. In one embodiment, SQL INSERT, UPDATE, and DELETE commands are non-commit actions. In one embodiment, data definition ("DDL") statements (e.g., "CREATE TABLE," "DROP TABLE," "ALTER TABLE," etc.) commands are treated as commit actions. The results that are obtained from the execution of a non-commit action depend on the commit actions that have been executed prior to that non-commit action.

"Wait For" and "Commit" Database Sequence Numbers

In one embodiment of the invention, when the capture-phase database server system 180 receives a database command in a database request, the database replay capture mechanism 181 assigns, to that database command, the "current" database sequence number, referred to hereinafter as the database command's assigned "wait for" database sequence number. For example, if the "current" database sequence number is "90" at the time that capture-phase database server system 180 receives the database command, then the database replay capture mechanism 181 assigns, to that database command, a database sequence number of 90. This is done for both commit and non-commit actions.

In one embodiment of the invention, commit actions are associated with two separate database sequence numbers by the database replay capture mechanism 181: the "wait for" database sequence number that is assigned to the commit action when the capture-phase database server system 180 receives the commit action, and another "commit" database sequence number that is assigned to the commit action when the capture-phase database server system 180 finishes executing the commit action. Typically, the capture-phase database server system 180 increases the "current" database sequence number whenever the capture-phase database server system 180 finishes executing a commit action. A significant amount of database activity may occur in between the time that the capture-phase database server system 180 receives a particular commit action and the time that the capture-phase database server system 180 finishes executing that particular commit action. As a result, the "current" database sequence number that is assigned by the database replay capture mechanisms 181 to the commit action when that commit action is done executing may be higher than the database sequence number that was assigned by the database replay capture mechanism 181 to the commit action when the capture-phase database server system 180 receives that action. Thus, a particular commit action's "wait for" database sequence number may differ from that particular commit action's "commit" database sequence number.

In one embodiment of the invention, the database replay capture mechanism 181 stores, in database workload log 186, both of the database sequence numbers that are assigned to each commit action in association with the application request identifier included in the database request that contained the commit action. The presence of the "commit" database sequence number in the database workload log 186 allows the database replay synchronization mechanism 182 to determine the value to which the replay phase database server system's 180 "current" database sequence number should be set after the execution, during the replay phase, of a commit action with which that "commit" database sequence number is associated.

Commit Point Ordering

In one embodiment of the invention, the database sequence numbers that are stored in the database workload log 186 are used during the pre-processing activities (discussed above) that are performed prior to the replay phase. In one embodiment of the invention, a dependency graph, which indicates the order in which various database commands need to be executed relative to each other, is built at pre-processing time based on the database change numbers that are associated with those database commands. Thus, the dependency graph may be considered a part of the database workload log 186. The database replay synchronization mechanism 182 uses this dependency graph during the replay phase to ensure that database commands are executed in a transactionally consistent manner.

In one embodiment of the invention, the dependency graph is a directed graph in which separate database commands are represented by separate nodes. Each node in the dependency graph may be connected to one or more other nodes by directional links. Links can be incoming or outgoing. A link incoming to a node indicates that the node's database command cannot be executed before the database command of the node from which that link comes. A link outgoing from a node indicates that the node's database command needs to be executed before the database command of the node to which that link goes. In one embodiment of the invention, the dependency graph is constructed in such a way that the use of the graph by the database replay synchronization mechanism 182 ensures that, for each commit action represented by a node in the graph, the replay phase database server system 180 will not execute, before that commit action, any database command that has a "wait for" database sequence number that is greater than the "commit" database sequence number of that commit action. Thus, when the dependency graph is constructed, each node that represents a database command that has a "wait for" database sequence number that is greater than the "commit" database sequence number of a particular commit action will be placed somewhere "downstream," link-wise, of the particular commit action's node in the dependency graph. This technique is called "commit point ordering."

In one embodiment, commit point ordering allows all non-commit actions that depend on a particular commit action to be executed concurrently during the replay phase. This follows from the realization that, during the capture phase, all non-commit actions that occur temporally between two specific commit actions could have occurred concurrently and in any order without affecting each other's results. Allowing all non-commit actions that depend on a particular commit action be executed concurrently during the replay phase prevents the replay phase execution from degenerating into a largely serial execution of database commands.

In one embodiment of the invention, before the replay phase database server system 180 executes a particular database command during replay time, the database replay synchronization mechanism 182 consults the dependency graph and determines whether the database commands of all other nodes that are "upstream," link-wise, of the particular database command's node in the dependency graph already have been executed relative to the replay phase database 185. The database replay synchronization mechanism 182 scheduled the particular database command for execution by the replay phase database server system 180 such that the replay phase database server system 180 does not execute the particular database command unless the database commands of all other nodes that are "upstream," link-wise, of the particular database command's node in the dependency graph already have been executed relative to the replay phase database 185. In one embodiment of the invention, whenever the replay phase database server system 180 executes a database command, the database replay synchronization mechanism 182 marks that database command's node in the dependency graph to indicate that the database command has been executed.

In one embodiment of the invention, whenever the replay phase database server system 180's "current" database change number increases during replay-time (e.g., in response to the execution of a commit action by the replay phase database server system 180), the database replay synchronization mechanism 182 determines, based on a comparison of the "current" database sequence number with the database sequence numbers of the yet-unexecuted database commands that the replay phase database server system 180 has received, which of those database commands the replay phase database server system 180 can now execute. In one embodiment of the invention, the database replay synchronization mechanism 182 instructs the replay phase database server system 180 to proceed to execute each such database command that is associated with an database sequence number that is not greater than the "current" database sequence number. In one embodiment of the invention, whenever the replay phase database server system 180 executes a commit action, the replay phase database server system 180 sets the "current" database sequence number to the value of that commit action's "commit" database sequence number—the execution of non-commit actions does not cause the replay phase database server system 180 to increase the replay phase database server system 180's "current" database sequence number.

In one embodiment, the database replay synchronization mechanism 182 maintains the "current" database sequence number for scheduling replayed database commands during the replay phase as a "replay" sequence number that is separate from the "actual" database sequence number maintained by the replay phase database server system 180 for regular database operation. In this embodiment, the database replay synchronization mechanism 182 uses the replay sequence number when scheduling replayed database commands for execution. Maintaining a separate replay sequence number for replay operations allows replay of an application workload without interfering with the actual database sequence number and regular database operations in the replay-phase database server system.

Each database command should "see" the proper state of replay phase database 185 when the replay phase database server system 180 executes that database command. For each database command, the state of the replay phase database 185 that the database command should "see" when executed is the state that corresponds to the "commit" database sequence number of the commit action represented by the node from which that database command's node directly depends in the dependency graph. Therefore, in one embodiment of the invention, whenever the replay phase database server system 180 is going to execute a non-commit action, the database replay synchronization mechanism 182 first determines the "commit" database sequence number of the commit action that is immediately "upstream," link-wise, of that non-commit action. The replay phase database server system 180 executes the non-commit action in the context of the database state, or "environment," that is indicated by the "commit" database sequence number of that commit action (rather than the "wait for" database sequence number of the non-commit action). This ensures that the database command will not "see" data that should persistently exist only in some future (relative to the database command) database state that the database command ought not to be able to "see." The database command will not "see" any data that was committed in the replay phase database 185 after the immediately "upstream" commit action.

Although the above description refers to the use of database sequence numbers specifically, various embodiments of the invention may, alternatively, utilize other kinds of transaction environment identifiers whose function and purpose is to represent database state and to ensure transactional consistency between multiple concurrently executing transactions.

Temporarily Relaxing the Ordering of Database Commands

In some cases it may not be possible to ensure consistency faithful ordering during the replay phase at the database command level. For example, a particular application request may have caused multiple database commands to be received at the capture phase database server system in a certain order and that certain order may be reflected in the database workload capture log. However, due to non-deterministic factors in the replay-phase application server system or because of configuration differences between the capture-phase application server system and the replay-phase application server system, the same particular application request, when replayed during the replay phase, may cause one or more database commands to be received at the replay-phase database server system that differ in one or more respects from the multiple database commands that the particular application request caused during the capture-phase. For example, a database command of the multiple database commands caused by the particular application request during the capture phase may be received by the replay phase database server system in different order during the replay phase. As another example, a database command not seen during the capture phase may be caused by the particular application request during the replay phase. In these cases where a database command caused by a particular application request during the replay phase is received out-of-order or is seen for the first time with respect to the database commands caused by the particular application request during the capture phase as recorded in the database workload capture log, an application request divergence has occurred. With an application request divergence, it might be that a commit action seen for the particular application request during the capture phase may never be received by the replay phase application server system during the replay phase. If the commit action is never received during the replay phase, then any database commands "downstream" of that commit action in the dependency graph can never execute. Without any accommodation of the application request divergence, the database replay synchronization mechanism will undesirably force all downstream database commands received at the replay phase database server system to wait indefinitely for the execution of the commit action that may never occur.

In one embodiment, to avoid this undesirable behavior, the database replay synchronization mechanism 182, upon detecting an application request level divergence for a particular application request, adjusts the handling for that particular application request. Adjusting includes identifying, based on the captured information in the database workload capture log 186 for the particular application, the last in-order commit action for the particular application request that was received by capture phase database server system during the capture phase. Then, all immediate downstream dependencies on any intermediate commit action for the particular application request between the divergence point and the last commit action are made immediately dependent on the last commit action. In one embodiment, the links in the dependency graph incoming to the nodes for the intermediate commit actions are moved to the node for the last commit action. In this way, when an application request divergence is detected, even though transactionally consistency at the database command level for the diverging application request may no longer be possible, transactionally consistency for the diverging application request at the application request level may be achieved.

Replay Client-Database Replay Synchronization Mechanism Network Communication Channel In one embodiment, a network communication channel 183 between the replay client(s) 113 and the database replay synchronization mechanism 182 is maintained during the replay phase. The communication channel 183 may be used by the replay client(s) 113 to inform the database replay synchronization mechanism 182 during the replay phase of the application request identifiers of the captured application requests that have been completely sent from the replay client(s) 113. With this information, the database replay synchronization mechanism 182 can decide that one or more commit actions associated with a particular application request may never arrive. In particular, if the database replay synchronization mechanism 182 is holding off execution of one or more database commands that are dependent on a particular commit action and that commit action, according to information in the database workload capture log 186, was caused by a particular application request that the replay client(s) 113 have completely sent, then the database replay synchronization mechanism 182 may conclude that the commit action may never arrive. In which case, the database replay synchronization mechanism 182 may relax transactional consistency. For example, the database replay synchronization mechanism 182 may allow all database commands immediately downstream of the commit action to execute immediately instead of delaying execution of those database commands until the commit action is executed which may never occur.

Hardware Overview—Implementing Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
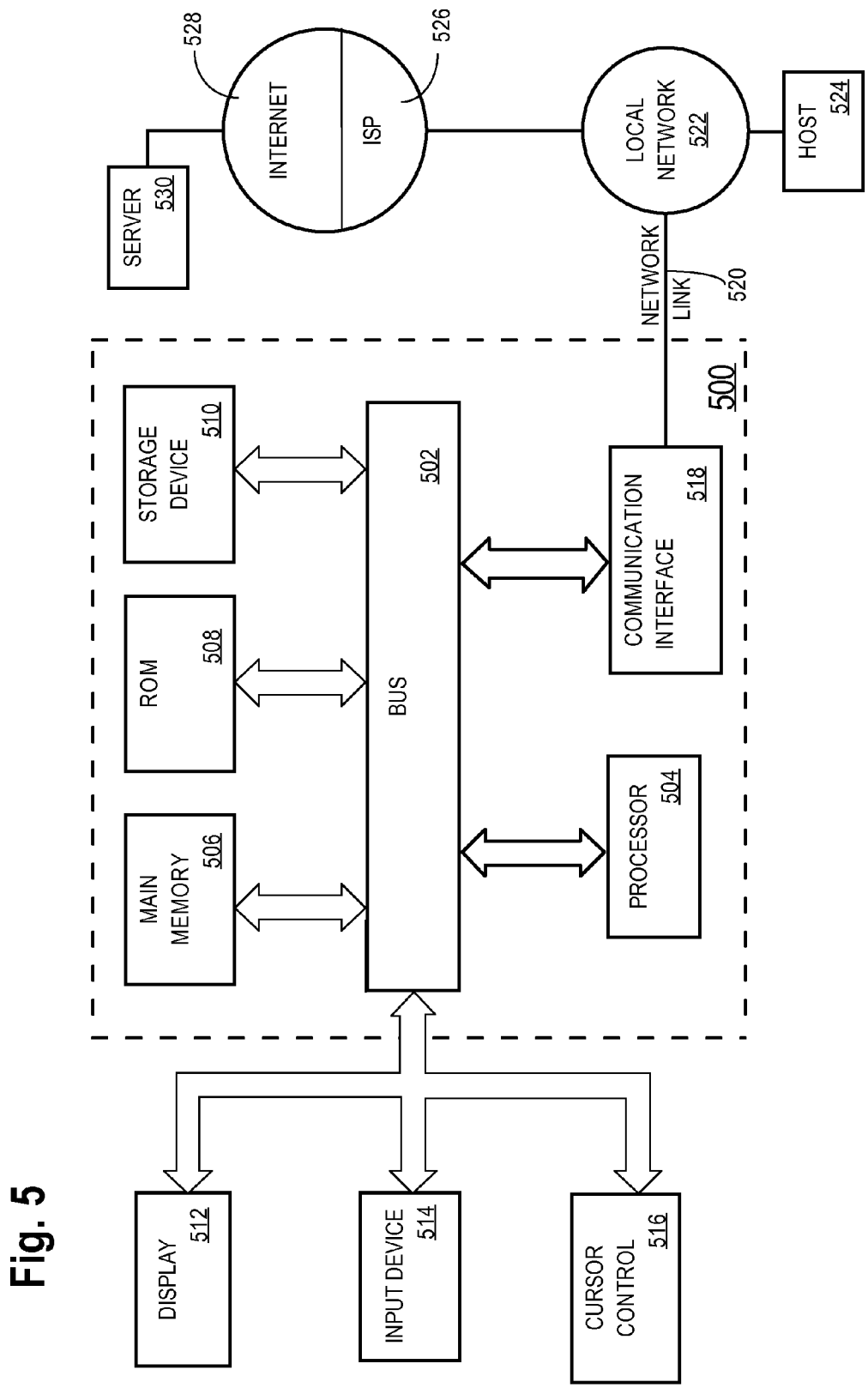
FIG. 5 is a block diagram of a computer system in which software-implemented embodiments of the present invention may be embodied.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for transactionally consistent replay of application workloads, the method implemented in a computer system having at least one processor and at least one memory, the method comprising:

during a replay phase, in which a plurality of application requests that were previously submitted to a capture-phase application server system during a capture phase are being replayed against a replay-phase application server system, receiving, at a database server system, a database request to execute a database command against a database;

wherein the plurality of application requests replayed against the replay-phase application server system represents a captured application server system workload;

wherein the database request specifies an application request identifier that identifies a particular application request of the plurality of application requests;

wherein the particular application request caused the database command to be executed previously during the capture phase;

in response to receiving the database request, determining, based on the application request identifier in the database request, whether to delay execution of the database command at least until a particular database transaction has been committed during the replay phase.

2. The method of claim 1, further comprising:
determining whether to delay execution of the database command based on a database sequence number assigned to the database command during the capture phase and based on a database sequence number assigned to the particular database transaction during the capture phase.

3. The method of claim 1, wherein, during the capture phase, a database request comprising the database command was received at a capture phase database server system after the particular database transaction was committed to a capture phase database; and wherein, during the replay phase, the database request comprising the database command is received at the database server system before the particular database transaction is committed.

4. The method of claim 1, wherein the database command is a commit action.

5. The method of claim 1, wherein the particular application request caused a plurality of database commands including the database command to be executed previously during the capture phase, the method further comprising:
determining, based on the application request identifier and the text of the database command, a database sequence number that was assigned to the database command during the capture phase.

6. The method of claim 1, wherein the particular application request caused a plurality of database commands including the database command to be executed previously during the capture phase, and wherein the particular application request, when replayed during the replay phase, causes the plurality of database commands to be received at the database server system in a different order than they were received at a capture phase database server system during the capture phase, the method further comprising:
in response to detecting the different order of the plurality of database commands during the replay phase, relaxing transactional consistency for the particular application request during the replay phase.

7. The method of claim 1, wherein the particular application request caused a plurality of database commands including the database command to be executed previously during the capture phase, and wherein the particular application request, when replayed during the replay phase, causes a database command to be received at the database server system that was not received as one of the plurality of database commands at a capture phase database server system during the capture phase, the method further comprising:
in response to detecting receipt of the database command during the replay phase that was not received during the capture phase, relaxing transactional consistency for the particular application request during the replay phase.

8. The method of claim 1, wherein during the replay phase a communication channel is maintained between one or more replay clients replaying the plurality of application requests and the database server system, the method further comprising:
receiving, from the one or more replay clients over the communication channel, an application request identifier of an application request that previously caused the particular database transaction to be committed to a database during the capture phase, and
in response to receiving the application request identifier over the communication channel, determining that execution of the database command should not be delayed until the particular database transaction has been committed during the replay phase.

9. The method of claim 1, wherein the capture-phase application server system and the replay-phase application server system is the same application server system.

10. A database system having one or more processors, the system comprising:
a database replay capture mechanism configured to perform, during a capture phase in which a plurality of application requests are submitted to a capture-phase application server system,
obtaining an application request identifier of a particular application request of the plurality of application requests,
assigning a database sequence number to a particular database command caused to be executed against a database by the particular application request, and
recording, in a capture log, data that reflects the particular database command in association with the database sequence number and the application request identifier;
a database replay synchronizing mechanism configured to perform, during a replay phase in which the particular application request that was previously submitted to the capture-phase application server system during the capture phase is being replayed against a replay-phase application server system,
obtaining the application request identifier of the particular application request,
determining, based on the application request identifier, whether to delay replay-phase execution of the database command at least until a particular replay-phase database transaction has been committed.

11. The system of claim 10, wherein the database replay synchronization mechanism is further configured to perform:
determining whether to delay execution of the database command based on a database sequence number assigned to the database command during the capture phase and based on a database sequence number assigned to the particular database transaction during the capture phase.

12. The system of claim 10, wherein, during the capture phase, a database request comprising the database command was received at a capture phase database server system after the particular database transaction was committed to a capture phase database; and wherein, during the replay phase, the database request comprising the database command is received at the database server system before the particular database transaction is committed.

13. The system of claim 10, wherein the database command is a commit action.

14. The system of claim 10, wherein the particular application request caused a plurality of database commands including the database command to be executed previously during the capture phase, and wherein the database replay synchronization mechanism is further configured to perform:

determining, based on the application request identifier and the text of the database command, a database sequence number that was assigned to the database command during the capture phase.

15. The system of claim 10, wherein the particular application request caused a plurality of database commands including the database command to be executed previously during the capture phase, and wherein the particular application request, when replayed during the replay phase, causes the plurality of database commands to be received at the database server system in a different order than they were received at a capture phase database server system during the capture phase, and wherein the database replay synchronization mechanism is further configured to perform:
   in response to detecting the different order of the plurality of database commands during the replay phase, relaxing transactional consistency for the particular application request during the replay phase.

16. The system of claim 10, wherein the particular application request caused a plurality of database commands including the database command to be executed previously during the capture phase, and wherein the particular application request, when replayed during the replay phase, causes a database command to be received at the database server system that was not received as one of the plurality of database commands at a capture phase database server system during the capture phase, and wherein the database replay synchronization mechanism is further configured to perform:
   in response to detecting receipt of the database command during the replay phase that was not received during the capture phase, relaxing transactional consistency for the particular application request during the replay phase.

17. The system of claim 10, wherein during the replay phase a communication channel is maintained between one or more replay clients replaying the plurality of application requests and the database server system, and wherein the database replay synchronization mechanism is further configured to perform:
   receiving, from the one or more replay clients over the communication channel, an application request identifier of an application request that previously caused the particular database transaction to be committed to a database during the capture phase, and
   in response to receiving the application request identifier over the communication channel, determining that execution of the database command should not be delayed until the particular database transaction has been committed during the replay phase.

18. The system of claim 10, wherein the capture-phase application server system and the replay-phase application server system is the same application server system.

19. One or more non-transitory computer-readable media storing instructions which, when executed by one or more processors, cause performance of a method for transactionally consistent replay of application workloads, the method comprising:
   during a replay phase, in which a plurality of application requests that were previously submitted to a capture-phase application server system during a capture phase are being replayed against a replay-phase application server system, receiving, at a database server system, a database request to execute a database command against a database;
   wherein the plurality of application requests replayed against the replay-phase application server system represents a captured application server system workload;
   wherein the database request specifies an application request identifier that identifies a particular application request of the plurality of application requests;
   wherein the particular application request caused the database command to be executed previously during the capture phase;
   in response to receiving the database request, determining, based on the application request identifier in the database request, whether to delay execution of the database command at least until a particular database transaction has been committed during the replay phase.

20. The one or more non-transitory computer-readable media of claim 19, the method further comprising:
   determining whether to delay execution of the database command based on a database sequence number assigned to the database command during the capture phase and based on a database sequence number assigned to the particular database transaction during the capture phase.

21. The one or more non-transitory computer-readable media of claim 19, wherein, during the capture phase, a database request comprising the database command was received at a capture phase database server system after the particular database transaction was committed to a capture phase database; and wherein, during the replay phase, the database request comprising the database command is received at the database server system before the particular database transaction is committed.

22. The one or more non-transitory computer-readable media of claim 19, wherein the database command is a commit action.

23. The one or more non-transitory computer-readable media of claim 19, wherein the particular application request caused a plurality of database commands including the database command to be executed previously during the capture phase, the method further comprising:
   determining, based on the application request identifier and the text of the database command, a database sequence number that was assigned to the database command during the capture phase.

24. The one or more non-transitory computer-readable media of claim 19, wherein the particular application request caused a plurality of database commands including the database command to be executed previously during the capture phase, and wherein the particular application request, when replayed during the replay phase, causes the plurality of database commands to be received at the database server system in a different order than they were received at a capture phase database server system during the capture phase, the method further comprising:
   in response to detecting the different order of the plurality of database commands during the replay phase, relaxing transactional consistency for the particular application request during the replay phase.

25. The one or more non-transitory computer-readable media of claim 19, wherein the particular application request caused a plurality of database commands including the database command to be executed previously during the capture phase, and wherein the particular application request, when replayed during the replay phase, causes a database command to be received at the database server system that was not received as one of the plurality of database commands at a capture phase database server system during the capture phase, the method further comprising:
   in response to detecting receipt of the database command during the replay phase that was not received during the capture phase, relaxing transactional consistency for the particular application request during the replay phase.

26. The one or more non-transitory computer-readable media of claim 19, wherein during the replay phase a communication channel is maintained between one or more replay clients replaying the plurality of application requests and the database server system, the method further comprising:

receiving, from the one or more replay clients over the communication channel, an application request identifier of an application request that previously caused the particular database transaction to be committed to a database during the capture phase, and in response to receiving the application request identifier over the communication channel, determining that execution of the database command should not be delayed until the particular database transaction has been committed during the replay phase.

27. The one or more non-transitory computer-readable media of claim 19, wherein the capture-phase application server system and the replay-phase application server system is the same application server system.

* * * * *

UNITED STATES PATENT AND TRADEMARK OFFICE
CERTIFICATE OF CORRECTION

PATENT NO. : 8,380,664 B2  
APPLICATION NO. : 13/034526  
DATED : February 19, 2013  
INVENTOR(S) : Papadomanolakis et al.

Page 1 of 1

It is certified that error appears in the above-identified patent and that said Letters Patent is hereby corrected as shown below:

In the Specification

In column 11, line 32-39, delete "In one embodiment, in................23248098121:" and insert the same after "request.'" on Col. 11, Line 31, as a continuation of the same paragraph.

Signed and Sealed this
Eighth Day of September, 2015

Michelle K. Lee
*Director of the United States Patent and Trademark Office*